United States Patent [19]

Schellenberg

[11] Patent Number: 4,550,854
[45] Date of Patent: Nov. 5, 1985

[54] DEEP-DRAWN CONICAL PLASTIC CONTAINER AND METHOD OF MAKING

[75] Inventor: Walter Schellenberg, Diepoldsau, Switzerland

[73] Assignee: Sandherr Packungen AG, Switzerland

[21] Appl. No.: 521,599

[22] Filed: Aug. 9, 1983

[30] Foreign Application Priority Data

Aug. 10, 1982 [CH] Switzerland ............... 4792/82

[51] Int. Cl.⁴ ............... B65D 90/02; B65D 3/22
[52] U.S. Cl. ............... 220/468; 229/1.5 B
[58] Field of Search ......... 220/468, 400, 408, 68, 220/460; 229/1.5 B

[56] References Cited

U.S. PATENT DOCUMENTS

| | | | |
|---|---|---|---|
| 1,389,594 | 9/1921 | Moore | 229/1.5 B X |
| 1,771,765 | 7/1930 | Benson | 229/1.5 B |
| 2,266,828 | 12/1941 | Sykes | 229/1.5 B X |
| 2,721,674 | 10/1955 | Lazard | 220/461 |
| 3,321,070 | 5/1967 | Childs | 220/460 X |
| 3,374,922 | 3/1968 | Shelby | 229/1.5 B X |
| 3,443,714 | 5/1969 | Edwards | 220/468 X |
| 3,471,075 | 10/1969 | Wolf | 229/1.5 B |
| 3,722,732 | 3/1973 | Edlund | 220/66 |

FOREIGN PATENT DOCUMENTS

| | | | |
|---|---|---|---|
| 2331005 | 1/1975 | Fed. Rep. of Germany | 229/1.5 B |
| 1399307 | 4/1965 | France | 229/1.5 B |
| 79495 | 6/1952 | Norway | 229/1.5 B |

Primary Examiner—Stephen Marcus
Assistant Examiner—Robert Petrik
Attorney, Agent, or Firm—Roylance, Abrams, Berdo & Goodman

[57] ABSTRACT

During the deep drawing of a cup-shaped container from a plastic sheet, its wall is surrounded by a sleeve of cardboard material or the like which reinforces and insulates the container and can be used to carry decorations. The upper and lower edges of the sleeve are enclosed by radial protrusions of the plastic of the container so that they cannot come into contact with the moisture of a base surface. Positive engagement between sleeve and container is ensured and the sleeve supports the wall which can be made very thin.

14 Claims, 3 Drawing Figures

DEEP-DRAWN CONICAL PLASTIC CONTAINER AND METHOD OF MAKING

This invention relates to a method for making a frustoconical container having an outwardly projecting rim at its open end using a deep-drawing process, and also including a layer of a material of a different type which cannot readily be welded to the plastic material.

BACKGROUND OF THE INVENTION

A container of this general type and a method for making that container are disclosed in German OS No. 3,120,075 by the present application. The process disclosed therein permits a considerable saving of plastic material so that the resulting container can have, for example, a composition of which only 25% is plastic. In addition, the use of a different material as the layer to be joined to the plastic container or cup can be advantageously utilized, for example, in that it can be easily decorated by a printing process and also can be made so that it has better insulating characteristics than the plastic material when the container is used as a drinking vessel or the like.

However, in such containers produced in accordance with the previous process, it is occasionally found to be disadvantageous that the outer layer which is used in forming the container is made of paper so that the container bottom is also made from a paper or cardboard material. Contact between the cardboard material and moisture when the container is placed on a wet surface leads to its damage or destruction. It will also be understood from OS No. 3,120,075 that it is not necessary to join the outer non-plastic layer to the plastic cup by adhesion or welding, although it is recommended that a hot-seal connection be provided, at least in the vicinity of the container bottom.

It is also known from German OS No. 2,052,877 to join a deep-drawn plastic container to a label in the drawing mold when forming a container from a plastic sheet, the label having a surface which is welded to the plastic sheet.

BRIEF SUMMARY OF THE INVENTION

An object of the present invention is to provide a method of forming a container having a plastic cup-like portion and an outer non-plastic layer which permits a saving of plastic material but avoids the problem of the outer layer of different material coming into contact with moisture when the container is placed on a wet surface.

A further object is to provide such a container wherein there is a reliable connection between the outer layer of different material and the plastic container even though the outer layer of material is not of a type which can be readily welded to the plastic.

Briefly described, the invention includes a process for making a frustoconical cup-like container with an outwardly projecting rim at the open end thereof comprising inserting into a deep-drawing mold a sleeve of a non-polymeric material of a type which cannot be welded to plastic material, the sleeve being open at both ends, said sleeve being arranged in the mold so that its upper and lower ends are axially spaced from the top and bottom extremes of the mold, deep drawing a plastic sheet of uniform thickness into a member having a cup-like shape within the sleeve, forming the cup-like shape so that portions immediately above and below the sleeve extend radially outwardly adjacent the sleeve ends to thereby axially enclose the sleeve, and drawing that portion of the cup-like member which lies within the sleeve to a minimum thickness which is significantly less than the thickness of the upper and lower end portions.

In another aspect, the invention includes a container comprising a deep-drawn plastic cup having a bottom portion, a main wall portion and a radially protruding top rim, said main wall portion being generally frustoconical and having a thickness less than half of the thickness of the other portions; a generally frustoconical sleeve surrounding said cup, said sleeve being formed from a material different from and not readily weldable to the plastic of said cup, said sleeve being shaped and dimensioned to surround and reinforce said main wall portion; and said cup further including means defining a radial outward protrusion around said bottom portion so that said sleeve is axially confined between said radial protrusion and said top rim and so that the axially facing edges of said sleeve are covered thereby.

As will be recognized from the following description, a significant advantageous of the present container is that during the deep-drawing process the lower edge of the surrounding sleeve of non-plastic material is enclosed or covered by the plastic so that the sleeve is spaced from the bottom and thus from a surface on which the container is placed so that there is no contact between the sleeve and moisture on the surface. Because of the fact that both the upper and lower edges of the sleeve are enclosed by the plastic material, there is a reliable connection between the sleeve and the plastic portion of the container and the sleeve can absorb forces acting in the longitudinal or axial direction of the container because it acts as a support. Such forces, which tend to cause the container to be crushed, are commonly encountered during use such as in automatic filling systems or when the article is being removed from the deep-drawing mold. The reduction of the amount of plastic used in the main wall portion of the container to an absolute minimum while still ensuring the sealing of the container is made possible because of the positive connection, produced in the mold, between the plastic sheet and the sleeve without welding being required.

As will also be recognized, the deep-drawing itself can be accomplished in a manner which is commonly known by mechanical preforming using a deep-drawing die and final shaping by the use of compressed air. The reduction of the sheet thickness to a desired range during deep drawing can be accomplished by a suitable temperature distribution during the preheating of the sheet, i.e., in a manner which is per se known in deep drawing technology.

In order that the manner in which the foregoing and other objects are attained in accordance with the invention can be understood in detail, particularly advantageous embodiments thereof will be described with reference to the accompanying drawings, which form a part of this specification, and wherein.

DETAILED DESCRIPTION OF PREFERRED EMBODIMENTS

Figures 1A, 1B:
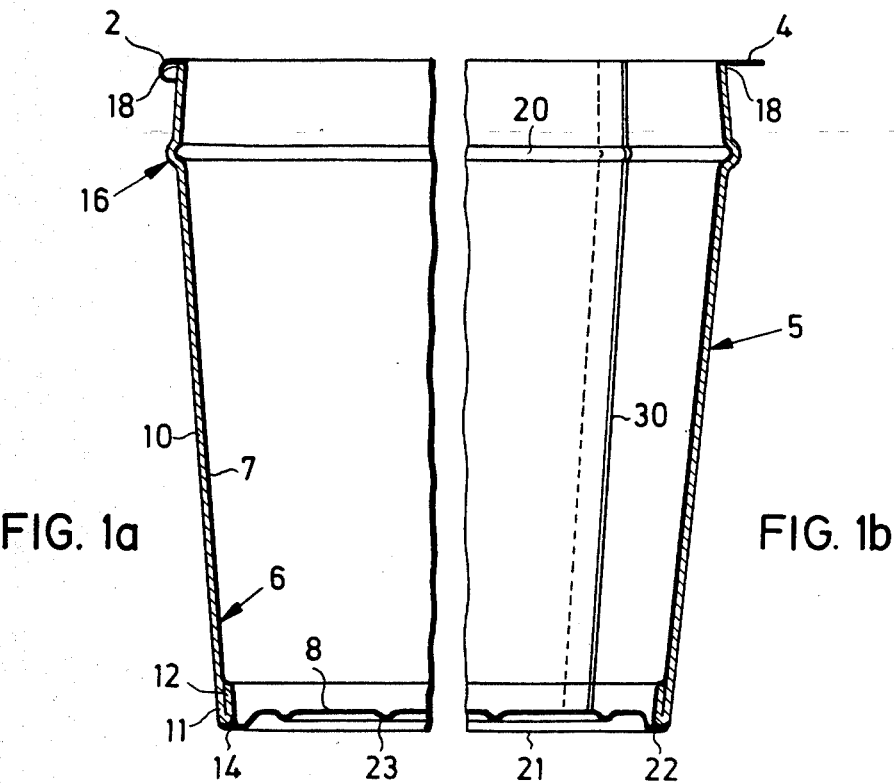
FIG. 1A is a front elevation, in section, of one-half of a container in accordance with the invention with a curled rim.
FIG. 1B is a front elevation of the other half of a container in accordance with the invention showing a flange-like rim.

As will be recognized, FIGS. 1A and 1B show the left- and right-hand portions of containers which are identical except for the upper rim structures, the article of FIG. 1A having a curled rim so as to be suitable for use as a drinking cup while the article of FIG. 1B has a flange which permits the container to be sealable in an air-tight fashion so that the container is usable for perishable goods such as to contain yogurt. Thus, the container rim of the cup has a rounded part 2 while the embodiment of FIG. 1B has a sealing flange to which a closing foil, not shown, can be sealed to extend across the upper open end of the container.

The plastic container assembly indicated generally at 5 in accordance with the invention has an internal plastic layer 6 shaped from a deep-drawn sheet, which extends in a single unitarily formed body from a main wall part 7 into a bottom part 8 and upwardly into rim 2 or 4 so that the liquid-tight integrity and sealing of the container is guaranteed. During the deep drawing process, wall part 7 is formed with a much smaller wall thickness than that of the bottom and top rim and that portion is surrounded by a sleeve 10 which is preferably made from a paper or cardboard material and which gives the container suitable rigidity. Numerous other materials can be used instead of paper or cardboard as a function of the particular demands to be made on the article as a container or a cup. It is particularly advantageous to use an inexpensive material such as a course cardboard which can be recycled material and which is provided on one side with a paper layer permitting easy printing for producing decorative effects and informational indicia. Apart from imparting increased rigidity and strength of the container, the sleeve also provides good insulation so that it is particularly suitable for use as a drinking cup for hot beverages.

In the example of FIGS. 1A and 1B, the lower rim 11 of sleeve 10 is beaded, folded or crimped inwardly so that the bottom annular portion of the container has increased strength to resist radially acting forces. The bulge resulting from bead 12 leads to a positive connection between the sleeve 10 and the plastic layer 6. As a result of the inward beading, the lower cut edge of the sleeve is enclosed and consequently hidden, and no moisture can penetrate through to it.

The lower edge of sleeve 10 is supported by a substantially continuous, radially outwardly projecting flange-like rim 14 which protrudes from the bottom part 8. This is achieved because of the fact that the sleeve 10 is axially positioned in the mold at a distance from the bottom-forming part of the mold. During deep drawing, the compressed air action firmly presses the deep-drawn plastic foil against the inside of the sleeve. This good connection between the plastic layer 6 and the sleeve can be further improved by a projection 16 shaped into the container wall.

The overlapping of the upper edge 18 of sleeve 10 by the rim 2, 4 of the plastic container is advantageous for hygienic reasons alone. In addition, this overlapping enhances the positive connection between the sleeve and the plastic cup portion. It will be recognized, however, that the attachment of sleeve 10 onto the plastic part 6 of the container in the axial direction also results from the conical shape of the plastic container wall which is chosen for manufacturing reasons and for container stacking reasons. For example, an annular ridge 20 can be pressed into the container wall and it will be obvious that in place of a single ridge a number of ridges or profilings can be juxtaposed in the container wall, additionally contributing to the reinforcement of the container. The container walls slopes upwardly and inwardly from ridge 16 at an angle of, for example, about 5°. This leads to the advantage that the containers can be more loosely stacked, i.e., they do not jam together when stacked. The removal of such a container from the mold as well as from other containers requires a certain amount of axial force, but this can be absorbed by the container because of the supporting action of the sleeve.

The container bottom 8 is preferably inwardly offset from the bottom plane 21 of the container in a manner which is per se known so that the container has only a circular standing surface 22. The container bottom can be reinforced by profilings 23 which can be arranged in different ways such as, for example, a honeycomb design.

Figure 2:
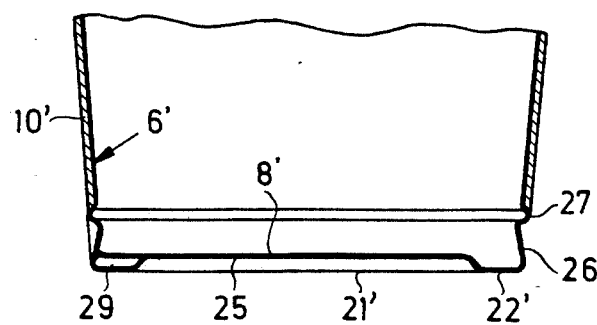
FIG. 2 is a partial front elevation, in section, showing the bottom structure of a container in accordance with the invention.

In the embodiment of FIG. 2, the entire bottom area of the container includes the plastic part 6' because the bottom of the cardboard sleeve 10' is disposed upwardly at a greater distance from the container bottom plane 21' as was true in the embodiment of FIGS. 1A, 1B. Adequate rigidity of the container bottom region is achieved by special profiling with a drawn-in bottom portion 25 and a conically inwardly directed circumferential wall 26. Wall 26 passes upwardly into a circular, annular substantially continuous shoulder 27 which also functions to stiffen the bottom area and to support the lower edge of sleeve 10'. Unlike in the embodiment of FIG. 1, the lower edge of sleeve 10' is cut off smoothly without any fold, although a bead 10 could alternatively be provided in this embodiment.

In much the same way as in the embodiment of FIG. 1, the standing surface 22' of the container has a circular configuration. This standing surface 22' can also be configured with a special profile or shape such as by providing a plurality of radial recesses or ribs 29 so that the container can stand on moist support surfaces without the container bottom forming a partial vacuum against the supporting surface.

The term "plastic" is employed herein to describe the material from which the cup-like container portion 6 is made. As will be understood, this term is intended to include a wide variety of polymeric materials and, particularly, can include sheets of material such a polystyrene, polyvinylchloride, polypropylene and the like, suitable materials being thermo-formable so that they can be deep-drawn, as described. Various other structural materials and forms are possible as will be seen from the disclosure of previously mentioned OS No. 3,120,075. The cut edges of the sleeve blank, which is preferably cut from cardboard material, or the entire sleeve surface can be protected against moisture by a paraffin coating. The axially extending sleeve edges can be overlappingly joined together by an adhesive layer. When an overlapping seam 30 extending in the axial direction or along a generatrix is formed in the sleeve, the plastic cup portion is correspondingly shaped, forming a shoulder in the plastic cup itself following the seam so that the sleeve is additionally positively held in a portion resistant manner.

The cardboard material thickness for the sleeve can correspond, for example, to a weight of about 200 to about 300 g/m². The plastic container portion preferably has, in the vicinity of the bottom portion and the rim at the open end, a thickness of between about 0.7 and about 0.8 mm, while in the area reinforced by the sleeve, i.e., the main wall portion 7, the thickness is only about 0.1 to about 0.2 mm when using a starting sheet of polystyrene having an initial thickness of about 0.9 mm.

While certain advantageous embodiments have been chosen to illustrate the invention, it will be understood by those skilled in the art that various changes and modifications can be made therein without departing from the scope of the invention as defined in the appended claims.

What is claimed is:

1. A container, comprising:
a deep-drawn plastic cup having a bottom portion, a main wall portion and a radially protruding top rim, said main wall portion being generally frustoconical and tapering upwardly and outwardly, having a thickness less than half of the thickness of the other portions and having a frustoconical top wall part tapering upwardly and inwardly and terminating at said radially protruding top rim, said top wall part being separated by an annular ridge from the remainder of said main wall portion;
a generally frustoconical sleeve surrounding said cup and within which said plastic cup is deep-drawn, said sleeve being formed from a material different from and not readily weldable to the plastic of said cup, said sleeve being shaped and dimensioned to surround, tightly engage and reinforce said main wall portion, said sleeve including a frustoconical top section tapering upwardly and inwardly with said top wall part of said plastic cup, and a frustoconical lower section tapering downwardly and inwardly with said main wall portion below said top wall part; and
said cup further including a radial outward protrusion around said bottom portion so that said sleeve is axially confined between said radial protrusion and said top rim so that the axially facing edges of said sleeve are covered thereby.

2. A container according to claim 1 wherein said sleeve is folded inwardly and upwardly at a bottom edge thereof forming a rounded bottom edge.

3. A container according to claim 1 wherein the lower edge of said sleeve includes an inwardly protruding bead contiguous with the cup.

4. A container according to claim 3 wherein said sleeve includes a generally axially extending overlapping seam forming a radial first shoulder
and said cup is formed with a second shoulder conforming to and positively engaging said first shoulder.

5. A container according to claim 4 wherein said outward protrusion comprises a radially outward extending annular ridge supporting the bottom end of said sleeve.

6. A container according to claim 5 wherein said bottom portion includes a bottom wall upwardly recessed from the lowest extremity of said cup, a generally annular reinforcing portion surrounding said bottom wall, and a plurality of feet extending downwardly from said reinforcing portion to said lowest extremity of said cup.

7. A container according to claim 4 wherein said bottom portion includes a bottom wall upwardly recessed from the lowest extremity of said cup, a generally annular reinforcing portion surrounding said bottom wall, and a plurality of feet extending downwardly from said reinforcing portion to said lowest extremity of said cup.

8. A container according to claim 3 wherein said outward protrusion comprises a radially outwardly extending annular ridge supporting the bottom end of said sleeve.

9. A container according to claim 4 wherein said bottom portion includes a bottom wall upwardly recessed from the lowest extremity of said cup, a generally annular reinforcing portion surrounding said bottom wall, and a plurality of feet extending downwardly from said reinforcing portion to said lowest extremity of said cup.

10. A container according to claim 1 wherein said sleeve includes a generally axially extending overlapping seam forming a radial first shoulder
and said cup is formed with a second shoulder conforming to and positively engaging said first shoulder.

11. A container according to claim 1 wherein said outward protrusion comprises a radially outwardly extending annular ridge supporting the bottom end of said sleeve.

12. A container according to claim 1 wherein said bottom portion includes a bottom wall upwardly recessed from the lowest extremity of said cup, a generally annular reinforcing portion surrounding said bottom wall, and a plurality of feet extending downwardly from said reinforcing portion to said lowest extremity of said cup.

13. A container, comprising:
a deep-drawn plastic cup having a bottom portion, a main wall portion and a radially protruding top rim, said main wall portion having a thickness less than half of the thickness of the other portions, having a frustoconical top wall part tapering upwardly and inwardly, having a frustoconical lower part tapering downwardly and inwardly, and having an annular ridge between said top wall part and said lower part;
a sleeve surrounding and tightly engaging said cup, said sleeve being formed from a material different from and not readily weldable to the plastic of said cup, and including a frustoconical top section tapering upwardly and inwardly with said top wall part, a frustoconical lower section tapering downwardly and inwardly with said lower part and a projection between said top and lower sections conforming to said annular ridge; and
a radial outward protrusion around said bottom portion of said cup so that said sleeve is axially confined between said radial protrusion and said top rim and so that the axially facing edges of said sleeve are covered thereby.

14. A container according to claim 13 wherein said sleeve is folded inwardly and upwardly at a bottom edge thereof forming a rounded bottom edge.

* * * * *